Aug. 4, 1936.  W. T. MURDEN  2,049,972
RETARDER
Filed May 29, 1935
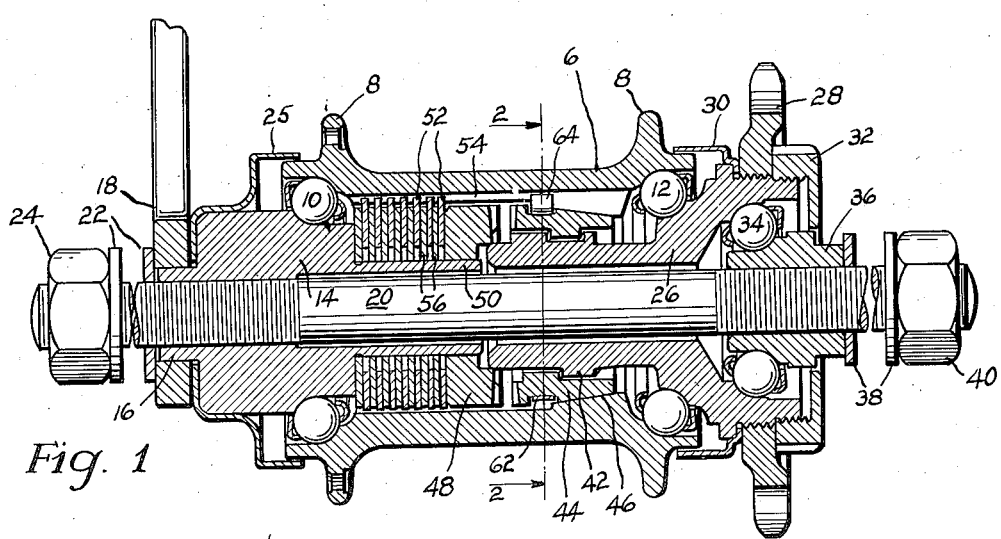
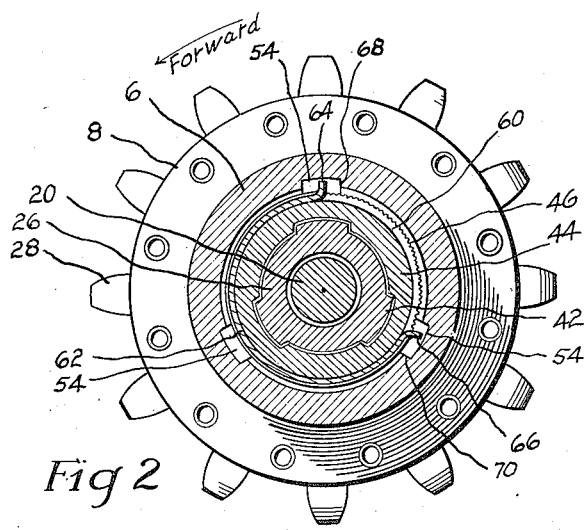
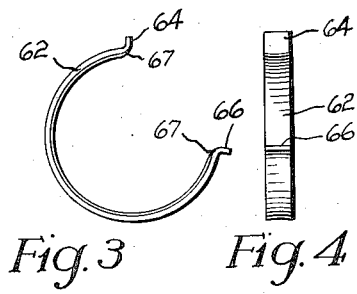
INVENTOR:
WILLIAM T. MURDEN,
BY
Gales P. Moore
HIS ATTORNEY.

Patented Aug. 4, 1936

2,049,972

UNITED STATES PATENT OFFICE 2,049,972

RETARDER

William T. Murden, Bristol, Conn., assignor to General Motors Corporation, Detroit, Mich., a corporation of Delaware Application May 29, 1935, Serial No. 24,077

9 Claims. (Cl. 192—6)

This invention relates to retarders and comprises all of the features of novelty herein disclosed. An object of the invention is to provide an improved transfer spring or lag device for coaster brakes and the like. Another object is to provide a transfer spring or retarder which will be self-unloading, that is, will tend to unwrap from its carrier when the bicycle is coasting and so diminish wear and frictional resistance to such coasting. Another object is to provide a simple, strong and efficient transfer spring.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a longitudinal sectional view of a bicycle hub.

Fig. 2 is a sectional view on the line 2—2 of Fig. 1.

Fig. 3 is a side view of the transfer spring.

Fig. 4 is a front view of the transfer spring.

The invention is illustrated in connection with a bicycle coaster brake comprising the usual hub 6 having spoke flanges 8, the hub being journalled for rotation on ball bearings 10 and 12. The bearing balls 10 of one row are carried on the usual stationary brake anchoring sleeve 14 having a non-circular extension 16 entering a similarly shaped opening in an anchoring arm 18. The anchoring sleeve 14 is threaded on the usual stationary axle 20 and a frame member (not shown) is clamped between the washers 22 by a nut 24. A shield or dust guard 25 overlies a projection of the hub and is secured to the sleeve 14. The bearing balls 12 of the other row run on a driving sleeve 26 rotated by a sprocket 28 clamped against a holding portion of a dust guard 30 by a nut 32. The driving sleeve 26 is journalled for rotation on a ball bearing 34 supported by a cone 36 threaded on the axle 20 next to frame clamping washers 38 and a nut 40. The driving sleeve 26 has coarse threads 42 of steep pitch co-operating with similar threads in a shiftable connector 44 having a serrated clutch surface at 46 to engage and drive the hub. The connector 44 is shiftable away from its driving position for coasting and is also shiftable to a greater extent for clutching engagement with a brake element 48 splined to a projection 50 of the brake anchoring sleeve 14. The usual slidable and rotary brake discs or friction washers 52 have lugs entering keyways 54 in the hub while the alternate, slidable but non-rotary brake discs 56 have lugs entering keyways in the projection 50.

The shiftable connector 44 has a peripheral groove 60 containing the improved transfer device or lag spring 62. This spring has a body portion which is generally arcuate and is arched in cross section except at the terminal lugs 64 and 66 which are substantially flat and radial where they enter the keyways 54. There is a little curve at 67 where each lug joins the spring body. The keyways 54 in the hub are usually spaced apart 120 degrees but, whatever the spacing may be, the lugs 64 and 66 are preferably spaced apart a little shorter distance with reference to the open portion of the spring. The result is that one of the lugs 64 is closer to a side wall 68 of the keyway 54 containing it than the remaining lug 66 is to the corresponding side wall 70 of another keyway. Accordingly, if the driving sleeve 26 is held stationary in order to coast, the overrunning hub will bring the side wall 68 into engagement with the lug 64 before any contact can occur between the side wall 70 and the lug 68. The result is a tendency to unwind or unwrap the spring from the groove 60 of the shiftable connector 44 thus decreasing frictional resistance to free running of the hub. It will be seen that, if both lugs were made to lie central in the keyways or if the lug 66 were initially placed nearer to the wall 70 than the lug 64 is to the wall 68, there would be a tendency to tighten the spring and increase the friction. When pushing the bicycle backwardly, the spring also tends to unwrap because the lug 66 will be engaged by the keyway wall opposite to the wall 70 before the lug 64 is engaged by the keyway wall opposite to the wall 68. The transfer spring has an inherent tendency to grip the bottom of the groove 60 and so furnishes the customary resistance or lag which enables the threads to work the shiftable connector axially. The spring is also preferably of greater arcuate extent than a half circle to hold itself on the connector 44. The bottom of the groove is transversely concave and fits the transversely convex surface of the spring and hence the spring tends to center itself laterally in the groove thus decreasing the tendency to cock or tilt laterally as would be the case with a flat-sectioned spring. The concavo-convex section also makes the spring stronger and better able to counteract warping after heat treatment. When one of the keyway walls such as 68 engages the lug 64, it tends to lift or open up that end of the spring but the corner of the keyway cannot dig into the lug because of the curve at 67, and the curve 67 at the other lug 66 prevents the spring from digging into its groove as the spring is pushed around therein.

I claim:

1. In a device of the character described, a member having angularly spaced keyways, a co-operating member having a peripheral surface, and an arcuate retarder frictionally engaging the peripheral surface and having spaced lugs projecting into the spaced keyways; substantially as described.

2. In a device of the character described, a member having angularly spaced keyways, a co-operating member having a peripheral surface, an arcuate retarder frictionally engaging the peripheral surface and having spaced lugs projecting into the spaced keyways, the lugs having lost motion in the keyways and being spaced apart a shorter angular distance than the keyways; substantially as described.

3. In a device of the character described, a member having angularly spaced keyways, a co-operating member having a peripheral groove, an arcuate retarder frictionally engaging in the groove and having terminal lugs projecting substantially radially from the groove, the lugs entering the spaced keyways and being spaced apart a shorter angular distance than the keyways; substantially as described.

4. In a device of the character described, a member having angularly spaced keyways, a co-operating member having a peripheral surface, an arcuate retarder frictionally engaging the peripheral surface and having lugs projecting into the spaced keyways, one of the lugs being a shorter distance from a side wall of its keyway than the other lug is from a corresponding side wall of its keyway; substantially as described.

5. In a device of the character described, a member having angularly spaced keyways and a co-operating relatively rotatable member having a peripheral surface, an arcuate retarder frictionally engaging the peripheral surface and having lugs projecting into the spaced keyways, the lugs being so spaced that engagement between a keyway side wall and a lug is always in a direction tending to unwrap the arcuate retarder from the peripheral surface; substantially as described.

6. In a device of the character described, a rotary hub having an internal axially extending keyway, a co-operating member having a peripheral surface, an arcuate retarder frictionally engaging the peripheral surface and being of concavo-convex cross section, the retarder having a terminal lug projecting substantially radially into the hub keyway and having lost motion between the side walls of the keyway; substantially as described.

7. In a device of the character described, a rotatable hub having keyways, a driving member, a shiftable connector, means for causing the connector to shift axially, and a spring frictionally engaging the connector and having terminal lugs projecting into the hub keyways; substantially as described.

8. In a device of the character described, a rotatable hub having keyways, a driving member, a shiftable connector, means for causing the connector to shift axially, and an arcuate spring frictionally engaging the connector and having lugs projecting into the keyways, the lugs being at the ends of the spring and being closer together than the hub keyways which they enter; substantially as described.

9. In a device of the character described, a rotatable driving member, a driven member, a braking element for said driven member, means to restrain rotation of said braking element, a shiftable connector adapted in one position to make driving connection between said driving member and said driven member and in another position to operate the braking element, means whereby relative rotation between said driving member and said connector effects the shifting of said connector, and a retarder for said connector and comprising an arcuate spring having its opposite ends provided with projecting terminal lugs; substantially as described.

WILLIAM T. MURDEN.